(12) United States Patent
Koenig et al.

(10) Patent No.: US 10,435,507 B2
(45) Date of Patent: *Oct. 8, 2019

(54) ULTRA-HIGH PURITY POLYCARBONATES HAVING GOOD INHERENT COLOR AND THERMAL RESISTANCE AND A DEVICE AND A METHOD FOR PRODUCING THE SAME

(71) Applicant: Covestro Deutschland AG, Leverkusen (DE)

(72) Inventors: Thomas Koenig, Leverkusen (DE); Joerg Kirchhoff, Cologne (DE); Michael Bierdel, Leverkusen (DE); Klemens Kohlgrueber, Kurten (DE); Johann Rechner, Kempen (DE); Ing. Johan Vaes, Kalmthout (BE); Johan Vanden Eynde, Zwijnaarde (BE); Frank Bruynseels, Sint Gillis (BE); Bert Ruytinx, Halen (BE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 110 days.

This patent is subject to a terminal disclaimer.

(21) Appl. No.: 15/789,704

(22) Filed: Oct. 20, 2017

(65) Prior Publication Data

US 2018/0105644 A1     Apr. 19, 2018

Related U.S. Application Data

(63) Continuation of application No. 13/375,052, filed as application No. PCT/EP2010/003205 on May 26, 2010, now Pat. No. 9,828,464.

(30) Foreign Application Priority Data

May 30, 2009   (EP) ..................... 09007270

(51) Int. Cl.
*C08G 64/40* (2006.01)
*B29C 48/07* (2019.01)
(Continued)

(52) U.S. Cl.
CPC ............ *C08G 64/406* (2013.01); *B29C 48/07* (2019.02); *B29C 48/13* (2019.02); *B29C 48/38* (2019.02);
(Continued)

(58) Field of Classification Search
CPC ......... B29C 48/07; B29C 48/13; B29C 48/38; B29C 48/385; B29C 48/39; B29C 48/40;
(Continued)

(56) References Cited

U.S. PATENT DOCUMENTS 3,410,823 A   11/1968   Cleveland
4,312,642 A    1/1982   Lehr et al.
(Continued)

FOREIGN PATENT DOCUMENTS

DE   2908352 A1   9/1980
DE   3429960 A1   2/1986
(Continued)

OTHER PUBLICATIONS

Schnell, "Chemistry and Physics of Polycarbonates", Polymer Reviews, vol. 9, Interscience Publishers, New York, London, Sydney 1964, pp. 33-70.
(Continued)

*Primary Examiner* — Frances Tischler
(74) *Attorney, Agent, or Firm* — K&L Gates LLP (57) ABSTRACT

The invention relates to polycarbonates with extremely low residual levels of volatile constituents and thermal degradation products, and also improved optical properties, especially Yellowness Index (YI) and good thermal stability, from solvent-containing polymer melts. The invention fur-
(Continued)

ther relates to an apparatus and a process for preparing these polycarbonates with the aid of a devolatilizing extruder with at least three devolatilizing zones, and zones for introducing entraining agent into dispersion are present upstream of at least three devolatilizing zones.

8 Claims, 4 Drawing Sheets

(51) Int. Cl.
| | |
|---|---|
| *B29C 48/13* | (2019.01) |
| *B29C 48/38* | (2019.01) |
| *B29C 48/39* | (2019.01) |
| *B29C 48/40* | (2019.01) |
| *B29C 48/385* | (2019.01) |
| *B29C 48/76* | (2019.01) |
| *C08G 64/20* | (2006.01) |
| *B29K 69/00* | (2006.01) |

(52) U.S. Cl.
CPC ............ *B29C 48/385* (2019.02); *B29C 48/39* (2019.02); *B29C 48/40* (2019.02); *B29C 48/767* (2019.02); *C08G 64/205* (2013.01); *B29K 2069/00* (2013.01)

(58) Field of Classification Search
CPC .............. B29C 48/767; B29K 2069/00; C08G 64/205; C08G 64/406
See application file for complete search history.

(56) References Cited

U.S. PATENT DOCUMENTS

| | | | |
|---|---|---|---|
| 4,631,338 A | 12/1986 | Meyer et al. |
| 5,684,087 A | 11/1997 | Wulff et al. |
| 5,777,064 A | 7/1998 | Hayashi et al. |
| 6,485,607 B1 | 11/2002 | Elsner et al. |
| 6,534,619 B1 | 3/2003 | Elsner et al. |
| 6,545,122 B1 | 4/2003 | Elsner et al. |
| 6,620,906 B1 | 9/2003 | Elsner et al. |
| 6,811,294 B1 | 11/2004 | Elsner et al. |
| 2005/0239995 A1 | 10/2005 | Kirchoff et al. |
| 2005/0239996 A1 | 10/2005 | Kirchoff et al. |
| 2005/0240003 A1 | 10/2005 | Galewski et al. |
| 2007/0225479 A1 | 9/2007 | Silvi et al. |
| 2008/0067711 A1 | 3/2008 | Schwemler et al. |
| 2011/0141843 A1 | 6/2011 | Bierdel et al. |
| 2011/0160381 A1 | 6/2011 | Konig et al. |

FOREIGN PATENT DOCUMENTS

| | | |
|---|---|---|
| DE | 19537113 | 10/1995 |
| DE | 19537113 C1 | 3/1997 |
| EA | 11129 B1 | 12/2008 |
| EP | 27700 A2 | 4/1981 |
| EP | 905149 A1 | 3/1999 |
| EP | 1088019 A2 | 4/2001 |
| EP | 1113848 A1 | 7/2001 |
| EP | 1165302 A1 | 1/2002 |
| EP | 1265944 A1 | 12/2002 |
| EP | 1165302 | 2/2003 |
| EP | 1556418 A1 | 7/2005 |
| EP | 1740638 A1 | 1/2007 |
| EP | 1742983 A1 | 1/2007 |
| JP | 05017516 A | 1/1993 |
| JP | H07268092 A | 10/1995 |
| JP | H09165442 A | 6/1997 |
| JP | 10292050 A | 11/1998 |
| JP | 2002060482 | 2/2002 |
| RU | 2238128 C2 | 10/2004 |
| WO | 000076657 A1 | 12/2000 |
| WO | 2000076657 A1 | 12/2000 |
| WO | 2005103114 A1 | 11/2005 |

OTHER PUBLICATIONS

Bierdel, et al., "Co-Rotating Twin-Screw Extruders—Fundamentals, Technology and Applications", pp. 183-184 Carl Hanser Publishers, Munich (2008).

Young et al., "Taste and Odour Threshold Concentrations of Potential Potable Water Contaminants", Wat, Res. vol. 30, No. 2, pp. 331-340 (1996).

H. Burttschel et al., J.Am. Water Works Assoc., 51:205(1959) "Chlorine derivative of phenol causing taste and odor" and C. Joll et al., Curtin University of Technology, Centre for Applied organic Geochemistry "The Chemistry of Halophenol Tastes in Perth Drinking Water".

ULTRA-HIGH PURITY POLYCARBONATES HAVING GOOD INHERENT COLOR AND THERMAL RESISTANCE AND A DEVICE AND A METHOD FOR PRODUCING THE SAME

CROSS-REFERENCE TO RELATED APPLICATIONS

This application is a continuation application of U.S. patent application Ser. No. 13/375,052, which has a 371(c) date of Mar. 8, 2012 which is the U.S. National Stage Application, filed under 35 U.S.C. § 371, of International Application No. PCT/EP2010/00325, which was filed on May 26, 2010, and which claims priority to European Patent Application No. 09007270.3, which was filed on May 30, 2009, the contents of each are incorporated by reference into this specification.

FIELD

The invention relates to polycarbonates with extremely low residual levels of volatile constituents and thermal degradation products, and also improved optical properties, especially yellowness index (YI) and good thermal stability, from solvent-containing polymer melts. The invention further relates to an apparatus and a process for preparing these polycarbonates with the aid of a devolatilizing extruder with at least three devolatilizing zones, and zones for introducing entraining agent into dispersion are present upstream of at least three devolatilizing zones.

BACKGROUND

In the known interfacial process for preparing polycarbonates, solvents such as aromatic chlorohydrocarbons such as chlorobenzene and dichloromethane are used, the residual contents thereof in the end product being unwanted since they are disruptive in the polycarbonate. In order to remove these volatile constituents, the devolatilizing extruder has to be operated at relatively high temperatures by the processes known from the prior art, which gives rise to thermal damage and degradation products, and this has the disadvantage of worsened optical properties due to defective structures.

Efficient concentration of the polycarbonate solution and vaporization of the residual contents of solvents at low temperatures is therefore of utmost importance for obtaining polycarbonates with improved optical properties.

There have been a variety of literature descriptions of the process for polycarbonate synthesis by the interfacial process, for instance in Schnell, "Chemistry and Physics of Polycarbonates", Polymer Reviews, Volume 9, Interscience Publishers, New York, London, Sydney 1964, pages 33-70.

In the interfacial process, a disodium salt of a biphenol (or of a mixture of different biphenols), initially charged in aqueous alkaline solution (or suspension), is phosgenated in the presence of an inert organic solvent or solvent mixture which forms a second phase. The oligocarbonates which form and are present principally in the organic phase are condensed with the aid of suitable catalysts to give high molecular weight polycarbonates dissolved in the organic phase. The organic phase is finally removed and washed in a multistage process in order to remove residues of sodium and catalyst. Typically, the organic phase contains, after the reaction, 10-20% by weight of polycarbonate.

The polycarbonate subsequently has to be isolated from the organic phase. The common processes for concentrating the polycarbonate solution and for isolating the polycarbonate are described in the patent literature and in textbooks, and are familiar to those skilled in the art. The isolation of the polycarbonate from the solution is preferably performed by vaporizing the solvent thermally or by means of vacuum. In order to directly obtain the melt phase after the vaporization of the solvent, this process requires the use of a high-boiling (>100° C.) solvent, for example chlorobenzene. In order to improve the solubility of the polymer in the solvent during the reaction, a mixture of one or more high-boiling solvents and the low-boiling dichloromethane is also used. The weight ratio of dichloromethane to the high-boiling solvent is typically about 1:1.

One means of preparing polycarbonate without detectable amounts of residual solvent is the preparation by the transesterification process. This process too is familiar to the person skilled in the art and is likewise described in Schnell, "Chemistry and Physics of Polycarbonates". In this process, the monomers, a bisphenol or a mixture of different bisphenols, are reacted with a diaryl carbonate or a mixture of different diaryl carbonates, in an equilibrium reaction. The by-product formed here is a phenol or a mixture of phenols. These phenols are removed to build up to the desired molecular weight.

Polycarbonates prepared by the transesterification process inevitably contain the phenols formed in the reaction and residues of the bisphenol and diaryl carbonate (for example diphenyl carbonate) monomers. Residual diphenyl carbonate contents are, for example, in the range from 200 to 700 ppm. These substances are likewise disruptive. They are partly released during processing such as injection molding and extrusion at the processing site, and lead to odor nuisance and environmental pollution there. In addition, they can lead to deposit formation in injection molding and hence to reduced service lives. They can also be transferred from the polycarbonate to food and drink on contact with food and drink, and lead to changes in taste therein. Water is particularly sensitive to changes in taste. Particularly phenols tend to form halogenated phenols when food containers made of polycarbonate, in the course of cleaning and/or disinfection, come into contact with chlorine-active agents or strongly oxidizing agents in the presence of chlorine or bromine ions. The taste threshold of phenol in water is specified in the literature at 10 µg/l (Young & Crane et al., 1996); that of the halogenated phenols is about a factor of 500 lower (H. Burttschel et al., J. Am. Water Works Assoc., 51:205 (1959) "Chlorine derivative of phenol causing taste and odor" and C. Joll et al., Curtin University of Technology, Centre for Applied organic Geochemistry, "The Chemistry of Halophenol Tastes in Perth Drinking Water"). Therefore, residual phenol contents in polycarbonate are particularly unfavorable for water.

In addition, polycarbonates prepared by the transesterification process inevitably contain residues of catalysts. These catalysts are known to those skilled in the art and are disclosed in numerous patent specifications. They may, for example, be alkaline compounds of alkali metals and alkaline earth metals, for example sodium phenoxide, for example in concentrations greater than 30 ppb (based on sodium). Such compounds are unfavorable for the quality and stability of the polycarbonate. Since it is necessary, as is well known, for phenolic OH end groups in the transesterification process to react with aryl end groups with an increase in molecular weight, polycarbonates prepared by the transesterification process inevitably contain a certain minimum content of phenolic OH end groups. Polycarbonates prepared industrially by the transesterification process have concentrations of phenolic OH end groups which are, for example, above 200 ppm. Phenolic OH end groups are particularly harmful for polycarbonates because they adversely affect the stability of the polycarbonate and can lead, for example, directly to the redissociation of phenol and to the reformation of diaryl carbonates. The phosphonium catalysts used, for example, for the preparation of polycarbonate, for example tetraphenylphosphonium phenoxide, have the advantage of decomposing thermally, but likewise remain in the product in small residues and likewise reduce the stability of the polycarbonate.

A further means of preparing polycarbonate consists in the phosgenation of bisphenols in the presence of pyridine or mixtures of pyridine and chlorobenzene, as described, for example, in U.S. Pat. No. 3,114,432. Polycarbonates with residual pyridine contents are entirely unsuitable for food and drink applications due to the intense unpleasant odor.

Halogenated solvents exhibit similarly low sensory thresholds to phenols and the halogenated derivatives thereof. They do possess lower solubilities and migrate more slowly due to the lower diffusion constants thereof, but are converted to water according to the conditions and thus cause changes in taste. In taste tests, test subjects detected changes in taste even at chlorobenzene contents in water of 1 ppb. In order to reliably rule out such a change in taste, a residual chlorobenzene content in drinking water bottles produced from polycarbonate of less than 10 ppm is required.

The thermal degradation of polycarbonates can also give rise to cresols which, as a result of their intense taste, can likewise lead to changes in taste in foods.

A further means of preparing polycarbonate consists in the reaction in the phase interface with subsequent isolation of the polycarbonate from the organic solvent by injection of a heated gas, in particular steam, to drive out the volatile constituents. This involves spraying the polycarbonate solution with the carrier gas, and obtaining polycarbonate as a solid, in particular as a water-moist suspension. Other isolation methods are crystallization and precipitation, and the baking-out of the residues of the solvent in the solid phase. The latter process entails the use of dichloromethane as a solvent, it being possible to achieve residual contents of volatile solvent of about 2 ppm of dichloromethane.

However, residual contents of dichloromethane are particularly disruptive in the polycarbonate since dichloromethane is known to eliminate hydrochloric acid together with residual moisture in the processing operation, and can thus lead to discoloration of the polycarbonate and to corrosion on tools. At elevated temperatures, dichloromethane can also lead to losses of quality such as discoloration and gel formation in the workup operation.

In the case of phosgene preparation from chlorine and carbon monoxide, which is required for the interfacial process, any secondary methane component which occurs is known to be converted to carbon tetrachloride. In the spraying process, the carbon tetrachloride, which is a high boiler, is enriched compared to the dichloromethane, a low boiler, such that residual carbon tetrachloride contents in the region of up to 2 ppm can also remain after the spraying process. Residual carbon tetrachloride contents are, as the person skilled in the art knows, particularly undesirable in the product.

A further method is the isolation of polycarbonate from solution by injecting vapors of aromatic, nonchlorinated aromatic compounds, for example benzene, toluene, ethylbenzene or various xylenes, into a polycarbonate solution in dichloromethane with subsequent solidification and drying, as described, for example, in DE 3 429 960. Residual contents of aromatic compounds can likewise alter taste. No method for reliable removal of carbon tetrachloride and dichloromethane is taught in DE 3 429 960. A considerable disadvantage of this method comes to light in the industrial conversion. For this purpose, for reasons of economic viability and of environmental protection, it is absolutely necessary to close the substance circuits. In particular, the aromatics used, after removal from the polycarbonate, have to be recycled into the process. Low molecular weight constituents of the polycarbonate, for example thermally unstable bisphenols, are vaporized together with the solvent in the course of drying. They are subject to thermal and possibly oxidative stress in the circuit. The person skilled in the art knows that, for example, bisphenols are converted under thermal stress to colored, in particular yellow, compounds. These colored compounds are enriched in the circuit, and so they lead during prolonged operation to a constant deterioration in the colors of the polycarbonate produced. Industrial production of polycarbonates with a light intrinsic color is therefore impossible by this process. This effect does not occur in short-term tests as described in the examples of DE 3 429 960. Carbon tetrachloride is also enriched in this circuit in the course of prolonged operation, which eventually leads to unacceptably high contents of carbon tetrachloride in the polycarbonate.

Residual contents of high-boiling solvents such as aromatic hydrocarbons and chlorohydrocarbons are likewise disruptive. They are partly released during processing such as injection molding and extrusion at the processing site, and lead to odor nuisance and environmental pollution there. In addition, they can lead in injection molding to deposit formation and hence reduced service lives.

They can also be transferred from the polycarbonate to food and drink on contact with food and drink, and lead to changes in taste therein. An adverse effect on taste can already be found at residual contents of above 10 ppm of aromatic chlorohydrocarbons in the polycarbonate. There are no known prior art processes which reduce the residual content of aromatic hydrocarbons, especially chlorohydrocarbons, to a level of between 0.1 ppm and 10 ppm, and at the same time afford a product which reduce less than the detection limit of 0.5 ppm of dichloromethane and less than 15 ppm of phenols, and which at the same time can restrict any carbon tetrachloride which occurs to residual contents of less than the detection limit of 0.01 ppm, and afford constantly good color and thermal stability.

In the known processes for vaporization, or else flash vaporization, polycarbonate solutions are repeatedly heated under slightly elevated pressure to temperatures above the boiling point and these superheated solutions are subsequently decompressed into a vessel, the pressure in the vessel being lower than that corresponding to the vapor pressure in the solution. The repetition of the process is generally favorable since the concentration of polycarbonate in the solution after the reaction is relatively low, and the repetition of the process allows significant overheating to be avoided. Common processes for the evaporation of polycarbonate solutions using apparatus are familiar to those skilled in the art. For example, the superheated solution can be decompressed into a heated helical tube which opens into a separator.

Above a particular concentration of polycarbonate (about 60% by weight), evaporation by flash vaporization becomes more difficult as a result of the high viscosities. Evaporation up to about 60% is referred to hereinafter as preliminary evaporation. It is generally favorable to remove the residual solvent with other processes, apparatuses and machines. These may be, for example, devolatilizing extruders or vertical tubular devolatilizers. At the last stage, it is also possible to use strand devolatilizers or foam devolatilizers in order to achieve particularly low residual contents.

In the evaporation of polycarbonate according to the prior art, usually excessively high apparatus temperatures and excessively long residence times of the melt in the apparatus are employed, with which there is sufficient removal of residual volatile constituents in the polycarbonate melt, but damage to the polycarbonate thus prepared occurs. This product damage is usually a direct consequence of excessive thermal stress over the course of excessive residence time of the polymer melt in the devolatilizing apparatus. In the course of this, side reactions occur on the polycarbonate, which cause a deterioration in the optical properties, especially the formation of defective structures, which usually only become visible in UV light in the moldings produced from such polycarbonate. Examples of such defective structures are ultrafine particles and gel bodies. In the processing of polycarbonate to give optical data carriers, for example CDs or DVDs, such defective structures in the end product cause a considerable loss of quality, which is intolerable and has to be avoided.

EP 1 088 019 discloses the devolatilization of polycarbonate which has been prepared by the interfacial process, by means of a multistage preliminary evaporation with a final strand devolatilizer. An achieved concentration of aromatic chlorohydrocarbons (chlorobenzene) of 20 ppm is described therein.

Concentrations of chlorobenzene-containing polycarbonate solutions are described in EP-A 1 265 944 and EP-A1 113 848, the examples of which describe the preparation of 65% by weight polycarbonate solutions. For removal of residual volatiles in the polycarbonate, in contrast to the subsequent process steps described therein, such polycarbonate solutions can also be evaporated further in devolatilizing extruders.

EP 1 265 944 discloses a process for devolatilizing polycarbonate which has been prepared by the interfacial process with a strand or pipe devolatilizer. The lowest residual contents of aromatic chlorohydrocarbons achieved in the examples are 25 ppm.

EP 1 113 848 likewise discloses a process for devolatilizing polycarbonate which has been prepared by the interfacial process with a strand or pipe devolatilizer as the last stage. The lowest residual content of aromatic chlorohydrocarbons achieved in the examples are 50 ppm.

Such removals of residual volatiles from polycarbonate solutions with the aid of devolatilizing extruders are described in DE 29 08 352 and EP 1 165 302. In these two extruder processes, what is called backward devolatilization at the extruder inlet is described. In this case, an optionally preheated polymer solution is introduced into a twin-screw extruder and foams therein. The gases are then removed backward through the flights of the twin-screw extruder to a devolatilizing dome. In general terms, such backward devolatilization is prior art and is described, for example, in the textbook "Der gleichläufige Doppelschneckenextruder" [The Corotatory Twin-Screw Extruder], Klemens Kohlgrüber, Carl Hanser Verlag, ISBN 978-3-446-41252-1 [1], on pages 193-195. One disadvantage of backward devolatilization is a limitation in the amount of solvent evaporated off because the screw channels are relatively narrow and, as a result, high gas velocities are achieved, which can lead to entrainment of product into the backward devolatilizing dome. Thus, a relatively high proportion of residual solvent has to be evaporated out in the further stages of the extruder if 65 to 75% by weight polycarbonate solutions are introduced into these apparatuses and are to be concentrated down to a few ppm, based on the overall polycarbonate material, of residual solvent contents in the polycarbonate. Thermal damage to the polycarbonate may occur, for example yellowing, formation of insoluble constituents, specks, cleavage of the polymer chains, formation of residual monomers and other low molecular weight constituents, etc. It is also disadvantageous when a polycarbonate solution with residual contents of solvent, such as dichloromethane, is fed directly into an extruder, since the overheating of the solution, which is well known to the person skilled in the art, on the flights of the screw in the presence of, for example, dichloromethane can lead to local product damage and hence to discoloration of the overall product. The speeds of up to 390/min specified in EP 1 165 302 are absolutely necessary for good devolatilization, but lead at the same time to a significant temperature rise in the product and therefore to discoloration and formation of low molecular weight components in the polycarbonate.

One method for residual devolatilization of polycarbonate solutions with the aid of foaming agents is WO 2005/103114. This describes the vaporization of the organic solvent up to a polycarbonate content of 90 to 99.95% by weight, optional mixing of the melt thus obtained with a foaming agent and the devolatilization of the from one of the preceding melt by introduction via entry orifices into a separation vessel under reduced pressure. The residual contents specified in the examples were a minimum of 7 ppm of aromatic chlorohydrocarbons (chlorobenzene). The conducting elements specified therein for the melt under reduced pressure, which lead to particularly low residual contents, are unfavorable due to the risk of formation of gel.

One method for reducing residual contents of monomers and phenols in polycarbonates which have been prepared by the transesterification process is described in EP 1 742 983. This process achieves a reduction in the residual contents down to about 30 ppm of diaryl carbonate (in this case diphenyl carbonate). The conductive elements specified therein for the melt under reduced pressure, which lead to particularly low residual contents, are unfavorable due to the risk of formation of gel. This method too, owing to the reactivity of the polycarbonate prepared by transesterification, is unsuitable for reducing the residual phenol contents to less than 15 ppm.

Further prior art for removal of residual volatiles from solutions of thermoplastic polymers is EP 1 556 418, in which the injection and distribution of liquids, especially water, under pressure through specially configured liquid distributors in the polymer melt stream is described. hi the course of decompression in a separation chamber, with the aid of the vaporizing liquid, foaming of the polymer melt and hence concentration by vaporization of the solvents is achieved. The use of water as a foaming agent for the removal of residual volatiles from polycarbonate melts is inadvisable due to the risk of polymer degradation by hydrolysis. The European patent, incidentally, does not give sufficient teaching as to the configuration of the apparatus in which the devolatilization and concentration take place.

Further prior art for removal of residual volatiles from solutions of thermoplastic polymers is EP 905 149, in which the injection of blowing agents into the polymer stream counter to the flow direction thereof and the distribution of blowing agents, for example water or volatile aliphatic hydrocarbons, in this polymer stream are described. The use of water as a foaming agent for the removal of residual volatiles from polycarbonate melts is inadvisable due to the risk of polymer degradation by hydrolysis, and the use of other solvents is inappropriate with regard to recoveries in circuits and the remaining residual contents in the product.

In addition, EP-A 027 700 discloses the combination of a flash devolatilizer with a devolatilizing extruder for concentration of the solutions from olefin polymerization, the flash stage being preceded by injection of stream as an entraining agent into the polymer melt stream. In the case of polycarbonate melts, water at elevated temperature can lead to polymer degradation by hydrolysis.

Therefore, such a process is inadvisable for the removal of residual volatiles from polycarbonate melts. It is also stated therein that the product is "collected" in the devolatilizing vessel in the base of the apparatus, and is supplied to the extruder in contact with the base of the devolatilizing vessel, which leads to increased residence times of the polymer and hence to thermal damage.

EP 1 113 848 B1 described, for the last stage of the evaporation, a combination of pipe and strand devolatilizers. This involves first concentrating the polymer solution in a vertical shell-and-tube heat exchanger with downstream separator, proceeding from a solution containing 60% to 75% by weight of polycarbonate, to 98 to 99% by weight, and then concentrating it in a strand devolatilizer to residual contents of 5 to 500 ppm of chlorobenzene. In the case of use of a strand devolatilizer, the polymer melt is shaped to fine strands in a separator under reduced pressure and elevated temperature and thus freed of the solvent. The disadvantage of the strand devolatilizer technique is that effective devolatilization is ensured only by stable strands, meaning that they do not tear in the apparatus. The stability of the strands is influenced by the viscosity of the polymer solution. Too low a viscosity can lead to strand breaks. This leads to a restriction in the operating parameters with regard to temperature and inlet content of residual volatiles. In addition to the adverse influence on the viscosity, an excessive inlet concentration of volatiles directly has adverse effects on the success with which devolatilization can be achieved, since the mass transfer is determined purely by diffusion. The surface area for the mass transfer is, in contrast, fixed by the strand geometry. The requirement for a large area of the melt distributor required to obtain the strands additionally entails expensive, large apparatuses. These large apparatuses in turn inevitably have large areas which, in particular in the discharge, are flowed through by low flow rates. Such low flow rates lead to excessively long residence times of the polycarbonate close to the walls and induce unwanted changes in the polycarbonate there, such as discoloration and formation of gel.

[1], p. 193, FIG. 10.1 specifies, in schematic form, two processes for devolatilization of monomers or small amounts of solvent.

One process described therein (middle line of the figure) consists schematically of an addition zone, a kneading zone, a entraining agent addition in a mixing zone, a devolatilizing zone, a further entraining agent addition in a mixing zone, a further devolatilizing zone and a subsequent granulation. The kneading zone in this process leads to a high energy input, which is detrimental to product quality. Since only two devolatilizing zones are envisaged, devolatilization is not very successful. A further increase in the number of devolatilizing zones in this arrangement is impossible because the thermal stress would rise to too high a level as a result.

A further process described therein (lower line of the figure) consists schematically of an addition zone, a kneading zone, a devolatilizing zone, an entraining agent addition in a mixing zone, a further devolatilizing zone and a subsequent pelletization. The kneading zone in this process leads to a high energy input, which is detrimental to product quality. The first devolatilizing zone does not perform at low inlet concentrations as a result of the absence of entraining agent, and so the overall degassing performance of this schematic configuration is even lower than that of the middle line.

SUMMARY

It is an object of the invention to prepare a polycarbonate with extremely low residual levels of volatile constituents and thermal degradation products, and also improved optical properties, especially Yellowness Index (YI) and good thermal stability, from solvent-containing polymer melts.

BRIEF DESCRIPTION OF THE DRAWINGS

The present invention is elucidated in detail hereinafter with reference to figures and working examples. The figures show.

DETAILED DESCRIPTION

This polycarbonate preferably has low contents of aromatic chlorine compounds (in particular of chlorobenzene), dichloromethane, carbon tetrachloride, phenol, diaryl carbonates (in particular diphenyl carbonate), bisphenols (in particular bisphenol A), cresols, non halogenated aromatic compounds, sodium and other alkali metals, alkaline earth metals, pyridine and phenolic OH. It should also have light intrinsic color and good thermal stability.

The object is achieved, surprisingly, by using an apparatus and a process for preparing these polycarbonates with the aid of a devolatilizing extruder with at least three devolatilizing zones, in which zones for introducing entraining agent into dispersion are present upstream of at least three devolatilizing zones.

Devolatilizing extruders are known in principle to those skilled in the art and are described, for example, in [1]. Characteristic features of devolatilizing extruders are what are called the devolatilizing domes or devolatilizing orifices or devolatilization zones. These are housings with orifices through which the vapors which form can escape. It is well known that different devolatilizing domes can be operated at different pressures when the product is backed up between the devolatilizing domes, such that a seal forms between the different pressures.

The devolatilizing extruder can additionally be combined with a foam devolatilizer and optionally a heatable down-pipe devolatilizer. This apparatus combination is preferably then constructed such that the cone of the foam devolatilizer is arranged vertically on one of the first housings of the devolatilizing extruder, and at least 70%, preferably 100%, of the cross section of the screws which is open in the upward direction is available as an entry orifice for the melt which falls downward out of the downpipe devolatilizer.

Preferably, polycarbonate solutions which are prepared by the interfacial process in aromatic chlorohydrocarbons, for example chlorobenzene, as a solvent or in a mixture of aromatic chlorohydrocarbons with dichloromethane are gently and substantially freed of volatile components in this apparatus. In the case of a combination of the devolatilizing extruder with a foam devolatilizer and optionally a heatable downpipe devolatilizer, the downpipe devolatilizer, if present, is preferably passed through by the polycarbonate melt at the first stage, the foam devolatilizer in the second stage, and the devolatilizing extruder as the third stage.

The invention thus further provides a preparation process for removing volatile constituents from solvent-containing polymer melts, especially from polycarbonate melts comprising aromatic chlorohydrocarbons, with the aid of a devolatilizing extruder with at least three devolatilizing zones, and zones for introducing entraining agent into the dispersion are present upstream of at least three devolatilizing zones are used. The entraining agent is added at a pressure above the pressure of the polymer melt in the extruder. In a preferred embodiment, an apparatus combination of at least one foam devolatilizer and a devolatilizing extruder is used.

In a further preferred embodiment, an apparatus combination of at least one heatable downpipe devolatilizer, at least one foam devolatilizer and a devolatilizing extruder is used.

In a particularly preferred combination, this apparatus combination is designed such that the solvent-containing vapor formed in the foam devolatilizer is removed directly from the housing of the foam devolatilizer via what are called vapor lines.

In a further particularly preferred embodiment of this apparatus combination is injection and mixing of inert components, for example nitrogen, argon, carbon dioxide, water, methane or helium, or a mixture of one or more of these components, preferably nitrogen, as an entraining agent into the polymer melt stream upstream of the foam devolatilizer.

In a further particularly preferred embodiment of this apparatus combination, inert gas is injected as an entraining agent in one or more housings of the devolatilizing extruder.

The evaporation in the downpipe devolatilizer, if present, and the foam devolatilizer, said evaporation being upstream of the extruder, allows the speed of the extruder to be lowered once again and thus the temperature, and hence the product damage, to be reduced.

The downpipe devolatilizer used in accordance with the invention comprises at least one heatable shell-and-tube heat exchanger which is arranged vertically on a separator and is directly connected thereto. The tubes of the shell-and-tube heat exchanger which are charged with the polycarbonate melt open in an unrestricted manner into the separator, which in turn is connected in an unrestricted and unblockable manner directly to a discharge pump via the lower cone.

In a particularly preferred embodiment, the separator of the downpipe devolatilizer has, in the upper region, at least one exit orifice for removal of gaseous vapors, at least one separation vessel, on the base of which melt particles entrained by the vapor stream can separate out, and a condensation unit which may consist of one or more condensers, vacuum pumps and regulating valves. The design of such condensation units is known to those skilled in the art.

In a preferred embodiment, the downpipe devolatilizer consists of a shell-and-tube heat exchanger.

The polycarbonate solution is introduced through an entry orifice at the upper end of the downpipe devolatilizer and supplied via a distributor plate to a multitude of tubes which are heated externally. Preference is given to heating by means of condensing steam, a condensing organic heat carrier or a liquid organic heat carrier. The thermal energy for vaporization of solvent is introduced into the polycarbonate melt via the inner surface of the tubes. Solvent components vaporize at the same time to form a biphasic gas-liquid mixture. Thus, overheating of the polymer melt is prevented in a controlled manner. The vaporous solvent which escapes causes constant mixing and surface renewal of the polycarbonate melt, which causes it to be concentrated more efficiently. This melt is thermally stressed to a lesser degree as a result, and so the formation of unwanted by-products is distinctly reduced. The separate removal of the vapors from the downpipe devolatilizer additionally improves the overall performance of the foam devolatilizer/ devolatilizing extruder.

The polycarbonate solution entering the downpipe devolatilizer comprises preferably 65 to 95% by weight of polycarbonate, based on the total weight of the polycarbonate solution.

In a preferred embodiment, the additional introduction of entraining gases upstream of the downpipe devolatilizer and/or in the devolatilizing extruder further improves the degree of removal of residual volatiles in the polycarbonate melt in a gentle manner.

In a particularly preferred embodiment, the downpipe devolatilizer preferably has a shell-and-tube heat exchanger with vertical heated tubes with or without installed static mixers with an internal diameter of 5 to 30 mm, preferably of 5 to 15 mm, a length of 0.5 to 4 m, preferably of 1 to 2 m, and the throughput per heat exchanger tube through the tubes of 0.5 to 10 kg/h, preferably 3 to 7 kg/h, based on the polymer. The heating temperature of the tubes is from 240° C. to 360° C., preferably from 250° C. to 340° C. and most preferably from 260° C. to 300° C. The material for the tube bundle heat exchanger should be resistant to corrosive attacks by dichloromethane and should not damage the polycarbonate. Preference is given to using a low-iron or iron-free material. Preference is given to nickel-based materials with iron contents less than 4% by weight, more preferably the alloys with materials numbers (according to Stahlschlüssel [Key to Steel] 2007, Verlag Wegst GmbH): 2.4605 (NiCr23Mo16Al) and 2.4610 (NiMo16Cr26Ti).

In the foam devolatilizer, the evaporation is performed preferably from about 90% solvent to 0.1% solvent down to residual contents of 10 ppm to 250 ppm. The foam devolatilizer can be configured, for example, as described in EP 1 740 638. It preferably consists of a distributor which is arranged vertically on a separator and connected directly thereto. The orifices of the distributor which are charged with polycarbonate open, preferably in an unrestricted manner, into this separator.

Upstream of the foam devolatilizer, it is optionally possible to add a foaming agent in order to improve the evaporation. In order to initiate foaming of the polycarbonate melt in the foam devolatilizer and hence to achieve particularly effective devolatilization, sufficient solvent should be present in the polycarbonate melt. Preferably, the oversaturation of the polycarbonate melt with volatile constituents on entry into the entry orifices is accordingly at least 0.1 bar, preferably at least 0.5 bar and more preferably at least 1 bar. Oversaturation is defined as the difference in the vapor pressure of all volatile components on entry into the inlet orifices and the pressure in the separation vessel (also referred to hereinafter as separator or devolatilizing vessel). The vapor pressure is composed of the sum of the partial pressures of all components present in the polymer melt and depends on the temperature and the concentration of the volatile constituents. If solely residues of solvent in the polycarbonate melt build up the required vapor pressure, it is possible to dispense with the use of foaming agents.

The foaming agent which is optionally added consists of a low molecular weight substance with high vapor pressure, for example nitrogen, methane, hydrogen, helium, carbon dioxide or water.

Preference is given to carbon dioxide and nitrogen, particular preference to nitrogen. The way in which a foaming agent can be added is known to the person skilled in the art and is described, for example, in EP 1740638. Preference is given to using a static mixer for the addition. The vapor pressure of the foaming agent for the temperature which exists at the inlet into the inlet orifices of the foam devolatilizer at the set concentration of foaming agent in the melt is preferably 0.1 to 100 bar, more preferably 0.5 to 60 bar and most preferably 1 to 40 bar.

In a preferred embodiment, the lower part of the separator is connected in an unrestricted and unblockable manner to the devolatilizing extruder, such that the polycarbonate melt can pass directly into the devolatilizing extruder.

In another preferred embodiment, a discharge unit, preferably a gear pump, is arranged at the lower end of the separator, from which the polycarbonate melt can be pumped into the devolatilizing extruder.

The separator has, in the upper region, at least one exit orifice for removal of gaseous vapors by means of at least one separation vessel, on the base of which melt particles entrained by the vapor stream can separate out, and a vapor condensation unit, and also a vacuum generator with pressure regulation.

In a preferred embodiment, the distributor consists of a die plate with bores. Preferred diameters of the bores are preferably 0.8 to 5 mm, more preferably 1 to 4 mm.

In a further preferred embodiment, the distributor consists of a shell-and-tube heat exchanger in which the polycarbonate solution is simultaneously heated or cooled, preferably heated. The internal tube diameters of the shell-and-tube heat exchanger are preferably from 4 to 20 mm, more preferably 5 to 15 mm. The length of the tubes is preferably 300 to 2500 mm, more preferably 500 to 2000 mm. The mass flow per orifice is preferably 0.1 to 20 kg/h.

In the inlet of the foam devolatilizer, the concentration of polycarbonate, which corresponds to the concentration at the outlet of the downpipe devolatilizer, is preferably 85% to 99.99%, more preferably 90% to 99.95%.

In order to guarantee sufficient foaming and good devolatilization, the sum of the vapor pressures of all volatile components (residual solvents and foaming agents) should preferably be selected at least one bar above the pressure in the separator.

The pressure in the separation vessel is preferably from 0.1 mbar to 20 mbar, more preferably from 1 mbar to 10 mbar.

The residual concentration of solvent downstream of the foam devolatilizer is preferably 10 ppm to 250 ppm, more preferably 20 ppm to 100 ppm.

The temperature of the polycarbonate melt at the outlet of the foam devolatilizer is preferably 250° C. to 350° C., more preferably 280° C. to 320° C.

The devolatilizing extruder may be of single-shaft or multishaft design, preferably single-shaft, twin-shaft or four-shaft, most preferably twin-shaft. The design of a multishaft devolatilizing extruder may be co- or counter-rotatory, closely intermeshing or tangential, or, in the case of four or more shafts, a combination of closely intermeshing and tangential. Particular preference is given to the design as a closely intermeshing, corotatory twin-screw extruder.

The devolatilizing zones maybe configured with two or three flights, preferably two flights.

A high level of devolatilization can be achieved especially when, in accordance with further preferred embodiment, the extruder has several devolatilizing zones in conveying direction, to each of which a suction unit is attached. The pressure in each devolatilizing zone is preferably between 10 Pa and 10 kPa, more preferably between 100 Pa and 1 kPa. The number of devolatilizing zones is at least two, preferably at least three and more preferably at least four.

Each of the devolatilizing zones preferably has a devolatilizing dome through which the vapors which form are removed. Between the different devolatilizing zones of the extruders are arranged backup zones in which a pressure drop is generated by neutral or backward-conveying elements, as a result of which the free cross section of the extruder is completely filled. This enables different pressures in the gas space of the devolatilizing zones. Preference is given to using kneading elements or backward conveying screw elements for this purpose.

In a preferred embodiment, the devolatilization in the devolatilizing extruder can be positively influenced with an entraining agent which increases the devolatilization surface area. In the process according to the invention, the entraining agent is preferably added upstream of each of the devolatilizing zones in conveying direction. The entraining agent used may preferably be nitrogen.

The entraining agent is dispersed, for example, in a kneading or mixing zone. The design of such kneading or mixing zones is known to those skilled in the art and consists, for example, as shown in [1] on page 199, of a sequence (in conveying direction) of a backward-conveying zone, a toothed mixing zone and a further backward-conveying zone. The entraining agent is then introduced into dispersion in the toothed mixing zone. Instead of the toothed mixing zones, it is also possible to use kneading zones known to those skilled in the art. Such kneading zones are likewise known to those skilled in the art and are described, for example, in [1] on page 107 ff. The volume flow of entraining agent supplied should preferably be preferably 0.05% by mass to 0.3% by mass. Downstream of the last devolatilizing zone, additives and optionally a stream of molten polycarbonate are also added, which are mixed with the main stream in a pressure buildup zone. The additives are preferably premixed in a polycarbonate stream, particular preference being given to using a mixture of inventive polycarbonate and additives. Another alternative according to the prior art would be to add additives in solvents, for example, chloromethane, trichloromethane, chlorobenzene, toluene, xylene, acetone, alkanes, for example cyclohexane or n-hexane. However, this has the disadvantage that residual contents of these solvents are then found in the product.

In a further preferred embodiment, for example, it is also possible to use screw elements with pairs of corotatory screw shafts and pairs of screw shafts which scrape one another exactly, the generating and generated screw profile having a sequence of sealing region-transition region-channel region-transition region, one sealing region being a sequence of flight region-flank region-flight region, one channel region being a sequence of groove region-flank region-groove region, and one transition region being a sequence of screw profile regions which begins with a flank region and ends with a flank region. The regions of a screw profile equal to the outer screw radius are referred to as flight regions. The regions of a screw profile equal to the core radius are referred to as groove regions. The regions of a screw profile which are less than the outer screw radius and greater than the core radius as referred to as flank regions. Such screw elements are described, for example, in German Offenlegungsschrift DE 10 2008 029306.7, which was yet to be published at the filing date. In a "flight region", the screw elements have their greatest diameter and clean the wall. In a "groove region", the screw elements have their smallest diameter. In a "transition region", the screw elements have neither their greatest nor their smallest diameter. These screw elements are more preferably used for pressure buildup at the outlet of the extruder and for pressure buildup upstream of the entraining agent dispersion zones.

In a preferred embodiment, it is possible, for example, to use screw elements for multishaft screw machines with pairs of corotatory screw shafts and pairs of screw shafts which scrape one another exactly, with two or more screw flights Z, with an axis separation A and external diameter DE, where the sum of the flight angles of one element pair is greater than 0 and less than 2π–4Z arccos (A/DE). Such screw elements are described, for example, in German Offenlegungsschrift DE 10 2008 029305.9, which was yet to be published at the filing date. Particular preference is given to using such screw elements in the devolatilizing zones.

The thermoplastic polycarbonates obtainable by the process according to the invention preferably have residual contents of:
chlorobenzene and other aromatic chlorine compounds of less than 10 ppm, preferably less than 5 ppm and more preferably less than 2 ppm,
dichloromethane of less than 1 ppm, preferably less than 0.5 ppm,
monohydric phenols such as phenol, tert-butylphenol and cumylphenol of less than 15 ppm, preferably less than 5 ppm and more preferably less than 2 ppm,
alkanes of less than 10 ppm, preferably less than 5 ppm.

The thermoplastic polycarbonates obtained more preferably have residual contents of:
carbon tetrachloride of less than 0.01 ppm,
diaryl carbonates, in particular diphenyl carbonate and di-tert-butyl phenolcarbonate, of less than 5 ppm, preferably less than 2 ppm,
bisphenol A and other bisphenols of less than 5 ppm, preferably less than 2 ppm and more preferably less than 0.5 ppm,
sodium and other alkali metals and alkaline earth metals of less than 0.05 ppm,
cresols of less than 1 ppm, preferably less than 0.2 ppm,
phenolic OH groups of less than 300 ppm, preferably less than 200 ppm, more preferably less than 100 ppm,
alkaline earth metals of less than 0.1 ppm, more preferably less than 0.05 ppm,
pyridine of less than 1 ppm, preferably less than 0.1 ppm,
nonhalogenated aromatic compounds such as xylene and toluene of less than 10 ppm, preferably less than 5 ppm.

Diphenols suitable for the process according to the invention for preparation of polycarbonate have been described many times in the prior art.

Suitable diphenols are, for example, hydroquinone, resorcinol, dihydroxydiphenyl, bis(hydroxyphenyl)alkane, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes, and the alkylated, ring-alkylated and ring-halogenated compounds thereof.

Preferred diphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxy phenyl)-2-methylbutane, 1,3-bis[2-(4-hydroxyphenyl)-2-propyl]benzene (bisphenol M), 2,2-bis(3 methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,3-bis[2-(3,5-dimethyl-4-hydroxyphenyl)-2-propyl]-benzene and 1,1-bis(4-hydroxyphenyl)-3,3,5-trimethylcyclohexane (bisphenol TMC).

Particularly preferred diphenols are 4,4'-dihydroxydiphenyl, 1,1 bis(4-hydroxyphenyl)phenylethane, 2,2-bis(4-hydroxyphenyl)propane, 2,2-bis(3,5-dimethyl 4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

In the case of homopolycarbonates only one diphenol is used; in the case of copolycarbonates several diphenols are used; of course, the diphenols used, like all other chemicals and assistants added to the synthesis too, may be contaminated with the impurities originating from their own synthesis, handling and storage, although it is desirable to work with very substantially clean raw materials.

The monofunctional chain terminators required to regulate the molecular weight, for example phenol or alkylphenols, especially phenol, p-tert-butylphenol, isooctylphenol, cumylphenol, chlorocarbonic esters thereof, or acid chlorides of monocarboxylic acids, or mixtures of these chain terminators, are supplied to the reaction either with the bisphenoxide or the bisphenoxides, or else added at any other point in the synthesis, provided that phosgene or chlorocarbonic acid end groups are still present in the reaction mixture, or, in the case of the acid chlorides and chlorocarbonic esters as chain terminators, as long as sufficient phenolic end groups of the polymer which forms are available. Preferably, the chain terminator(s), however, is/are added after the phosgenation at a site or at a time where no phosgene is present any longer, but the catalyst is yet to be metered in. Alternatively, it can also be metered in before the catalyst, together with the catalyst or in parallel.

In the same way, branching agents or branching agent mixtures are optionally added to the synthesis. Typically, branching agents, however, are added before the chain terminators. In general, trisphenols, quaterphenols or acid chlorides of tri- or tetracarboxylic acids, or mixtures of the polyphenols or of the acid chlorides, are used. Some of the compounds which have three or more than three phenolic hydroxyl groups and are suitable as branching agents are, for example, phloroglucinol, 4,6-dimethyl-2,4,6-tri(4-hydroxyphenyl)heptene-2, 4,6-dimethyl-2,4,6 tri(4-hydroxyphenyl)heptane, 1,3,5-tri(4-hydroxyphenyl)benzene, 1,1,1-tri(4-hydroxyphenyl)-10 ethane, tri(4-hydroxyphenyl)phenylmethane, 2,2-bis(4,4-bis(4-hydroxyphenyl)cyclohexyl)-propane, 2,4-bis(4-hydroxyphenylisopropyl)phenol, tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri (4-hydroxyphenyl)ethane.

The catalysts used with preference in the interfacial synthesis of polycarbonate are tertiary amines, especially triethylamine, tributylamine, trioctylamine, N-ethylpiperidine, N-methylpiperidine, N-i/n-propylpiperidine, quaternary ammonium salts such as tetrabutylammonium hydroxide, chloride, bromide, hydrogensulfate or tetrafluoroborate, tributylbenzylammonium hydroxide, chloride, bromide, hydrogensulfate or tetrafluoroborate, tetraethylammonium hydroxide, chloride, bromide, hydrogensulfate or tetrafluoroborate, and the phosphonium compounds corresponding to the ammonium compounds. These compounds are described in the literature as typical interfacial catalysts, and are commercially available and familiar to the person skilled in the art. The catalysts can be added to the synthesis individually, in a mixture or else alongside one another and successively, optionally also before the phosgenation, but preference is given to metered additions after the introduction of phosgene, unless an onium compound or a mixture of onium compounds is used as catalysts. In this case, preference is given to addition before the metered addition of phosgene. The catalyst(s) can be metered in substance, in an inert solvent, preferably the solvent of the polycarbonate synthesis, or else as an aqueous solution, and in the case of the tertiary amines as the ammonium salts thereof with acids, preferably mineral acids, especially hydrochloric acid. In the case of use of several catalysts or the metered addition of portions of the total amount of catalyst, it is of course also possible to undertake different metering methods at different sites or at different times. The total amount of the catalysts used is 0.001 to 10 mol % based on moles of bisphenols used, preferably 0.01 to 8 mol %, more preferably 0.05 to 5 mol %.

The polycarbonate synthesis can be performed continuously or batchwise. The reaction can therefore be effected in stirred tanks, tubular reactors, pumped circulation reactors or stirred tank cascades, or combinations thereof. By using the mixing units already mentioned, it should be ensured that aqueous and organic phases separate as far as possible only when the synthesis mixture has reacted to completion, i.e. no longer contains any hydrolyzable chlorine of phosgene or chlorocarbonic esters.

After introduction of the phosgene, it may be advantageous to mix the organic phase and the aqueous phase for a certain time before any branching agent, if it has not been metered in together with the bisphenoxide, chain terminator and catalyst are added. Such a continued reaction time may be advantageous after each metered addition. These continued stirring times are 10 seconds to 60 minutes, preferably 30 seconds to 40 minutes, more preferably 1 to 15 minutes.

The organic phase may consist of solvent or mixtures of several solvents. Suitable solvents are chlorinated hydrocarbons (aliphatic and/or aromatic), preferably dichloromethane, trichloroethylene, 1,1,1-trichloroethane, 1,1,2-trichloroethane and chlorobenzene, and mixtures thereof. However, it is also possible to use aromatic hydrocarbons such as benzene, toluene, m/p/o-xylene, or aromatic ethers such as anisole alone, in a mixture with or in addition to chlorinated hydrocarbons. Another embodiment of the synthesis uses solvents which do not dissolve polycarbonate, but merely swell it. It is therefore also possible to use nonsolvents for polycarbonate in combination with solvents. The solvents used in the aqueous phase too may be soluble solvents such as tetrahydrofuran, 1,3/1,4-dioxane or 1,3-dioxolane when the solvent partner forms the second organic phase.

The completely reacted at least biphasic reaction mixture which contains at most traces (<2 ppm) of chlorocarbonic esters is left to stand for phase separation. The aqueous alkaline phase is possibly passed completely or partly back into the polycarbonate synthesis as an aqueous phase, or else sent to wastewater treatment, where solvent and catalyst components are removed and recycled. In another variant of the workup, after removal of the organic impurities, especially of solvents and polymer residues, and optional after the establishment of a particular pH, for example by adding sodium hydroxide solution, the salt which can be supplied, for example, to the chloralkalielectrolysis is removed, while the aqueous phase is optionally sent back to the synthesis.

The organic phase comprising the polycarbonate can then be purified to free it of all contaminations of alkaline, ionic or catalytic nature. The organic phase, even after one or more phase separations, still contains proportions of the aqueous alkaline phase in fine droplets, and the catalyst, generally a tertiary amine. The phase separations can optionally be promoted by virtue of the organic phase passing through settling tanks, stirred tanks, coalescers or separators, or combinations thereof, in which case water can optionally be metered in each or some separation steps, under some circumstances using active or passive mixing units.

After this rough separation of the alkaline aqueous phase, the organic phase is washed once or more than once with dilute acids, mineral acids, carboxylic acids, hydroxycarboxylic acids and/or sulfonic acids. Preference is given to aqueous mineral acids, especially hydrochloric acid, phosphorous and phosphoric acid, or mixtures of these acids. The concentration of these acids should be in the range of 0.001 to 50% by weight, preferably 0.01 to 5% by weight.

In addition, the organic phase is washed repeatedly with demineralized or distilled water. The organic phase, optionally dispersed with portions of the aqueous phase, is removed after the individual wash steps by means of settling tanks, stirred tanks, coalescers or separators or combinations thereof, in which case the washing water can optionally be metered in between the wash steps using active or passive mixing units.

Between these wash steps or else after the washing, it is optionally possible to add acids, preferably dissolved in the solvent which forms the basis of the polymer solution. Preference is given here to using hydrogen chloride gas and phosphoric acid or phosphorous acid, which can optionally also be used as mixtures.

The polycarbonates obtained by the reaction have, based on the weight of polycarbonate, contents of phenolic OH end groups of less than 300 ppm, preferably less than 200 ppm. After the wash, the polycarbonate still contains contents of less than 100 ppb of sodium, preferably less than 50 ppb of sodium, based in each case on the polycarbonate. After an acidic wash step, the sodium present is not in alkaline form, but in neutral form as a salt, as a result of which it attacks the polycarbonate to a much lesser degree.

This purified solution is then supplied in the subsequent step to one or more preliminary evaporation stages, which consist of flash stages or flash stages with helical tubes, until a concentration of about 65% polycarbonate has been attained. They are then preferably supplied to the inventive combination of downpipe devolatilizer, foam devolatilizer and devolatilizing extruder.

The polycarbonates obtained by the process according to the invention can be provided with the customary additives (e.g. assistance and reinforcing agents) to alter the properties. The addition of additives and admixtures serves to prolong the use time (e.g. hydrolysis or degradation stabilizers), to improve color stability (e.g. thermal and UV stabilizers), to simplify processing (e.g. demolding agents, flow assistants), to improve the use 'properties (e.g. antistats), to improve flame retardancy, to influence the visual impression (e.g. organic colorants, pigments) or to adjust the polymer properties to particular stresses (impact modifiers, finely divided minerals, fibrous substances, quartz flour, glass fibers and carbon fibers).

The invention is illustrated hereinafter with reference to FIG. 1, which shows a working example.

The polymer solution is supplied through a feed line 1 to the shell-and-tube heat exchanger 2 which is open at the bottom. The shell-and-tube heat exchanger is heated with heating medium which is supplied at 3 and removed at 4. At the end of the tubes, the polymer solution expands into the separation vessel 5 arranged directly above the extruder. The gas released is removed via the vapor line 6. The product falls directly into the intake zone 7 of the extruder and is supplied through a sealing zone 8 to the first devolatilizing zone 9 which has a devolatilizing dome 10. These are followed by further backup zones 8 and devolatilizing zones 9. Upstream of the last devolatilizing dome, nitrogen is added via the addition point 12 in the kneading zone 11. At the addition point 13, additives and optionally molten polymer are also added, which are mixed with the polymer stream in the pressure buildup and mixing zone 14.

The examples which follow serve to illustrate the invention by way of example and should not be interpreted as a restriction.

EXAMPLES

Example 1

Figure 1:
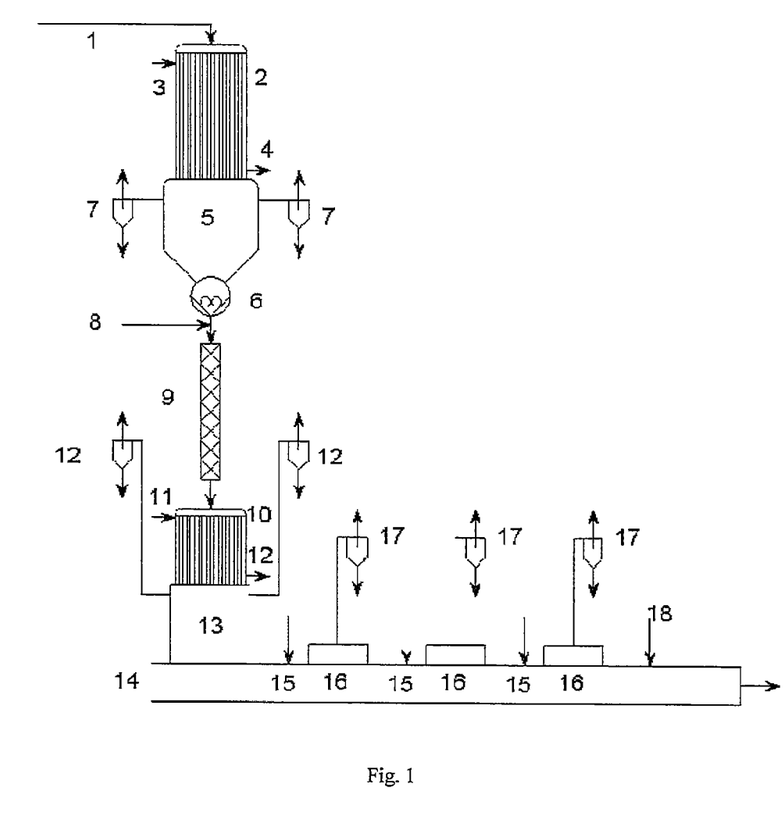
FIG. 1 illustrates an apparatus configuration as shown in Example 1.

The apparatus configuration of example 1 is shown hi FIG. 1. 7500 kg/h of polycarbonate with a relative viscosity of 1.295 would be supplied to the downpipe devolatilizer 2 in a solution containing 65% by weight of polycarbonate, 33.5% by weight of chlorobenzene and 1.5% by weight of dichloromethane, in a pipeline 1 with a temperature of 230° C. The downpipe devolatilizer was heated with vaporous heat carrier oil via the addition 3. The condensate was discharged via the outlet 4. The length of the pipes of the downpipe devolatilizer 2 was 2.5 m, the internal diameter was 10 mm and the number of pipes was 1150. The heating temperature was 330° C., the exit temperature of the polymer on exit into the separation vessel 5 was 295° C. The pressure in the separation vessel 5 was 250 mbar, the residual content of chlorobenzene was 5000 ppm and the residual content of dichloromethane was 50 ppm. The vapors which formed were removed from the separation vessel via two lines. Any entrained polymer was retained in the separators 7. The vapors were then condensed in a condenser. The pressure was adjusted with a vacuum pump.

The concentrated polymer solution was collected in the gear pump 6 and supplied to the static mixer 9. Via the addition 8, 0.1% by weight of nitrogen was added to the static mixer. The nitrogen was brought completely into solution in the static mixer 9.

The polymer melt containing the nitrogen was devolatilized further in a foam devolatilizer 11 which was directly above the devolatilizing extruder 14. The foam devolatilizer consisted of 1500 pipes with a length of 1.15 m, which were heated at 310° C. The pressure in the separation vessel 13 of the foam devolatilizer was 1 mbar. The pipes of the foam devolatilizer were heated with vaporous heat carrier oil via the addition 11. The condensed heat carrier oil was removed again via the outlet 12. The vapors which formed were removed from the separation vessel via two lines.

Any entrained polymer was retained in the separators 12. The residual chlorobenzene content downstream of the foam devolatilizer was 20 ppm. The separation vessel 13 of the foam devolatilizer was arranged directly above the devolatilizing extruder 14.

The devolatilizing extruder 14 was designed as a two-flight, closely intermeshing twin-screw extruder with a nominal diameter of 180 mm and a ratio of length to diameter of 40. It was equipped with three zones 15 for introducing entraining agent into dispersion, in each case followed by devolatilizing zones 16 for removal of the entraining agent and of the volatile constituents. Any entrained polymer was retained in the separators 17. At 18 additives which are present in a mixture with polycarbonate by means of a side extruder were added. This was followed by the pressure buildup for pelletization.

The speed of the extruder was 200/min. The temperature at the end of the extruder was 350° C.; the residual chlorobenzene content was 2 ppm. Dichloromethane was no longer detectable (<0.1 ppm). The yellowness index was 1.6.

Example 2

Figure 2:
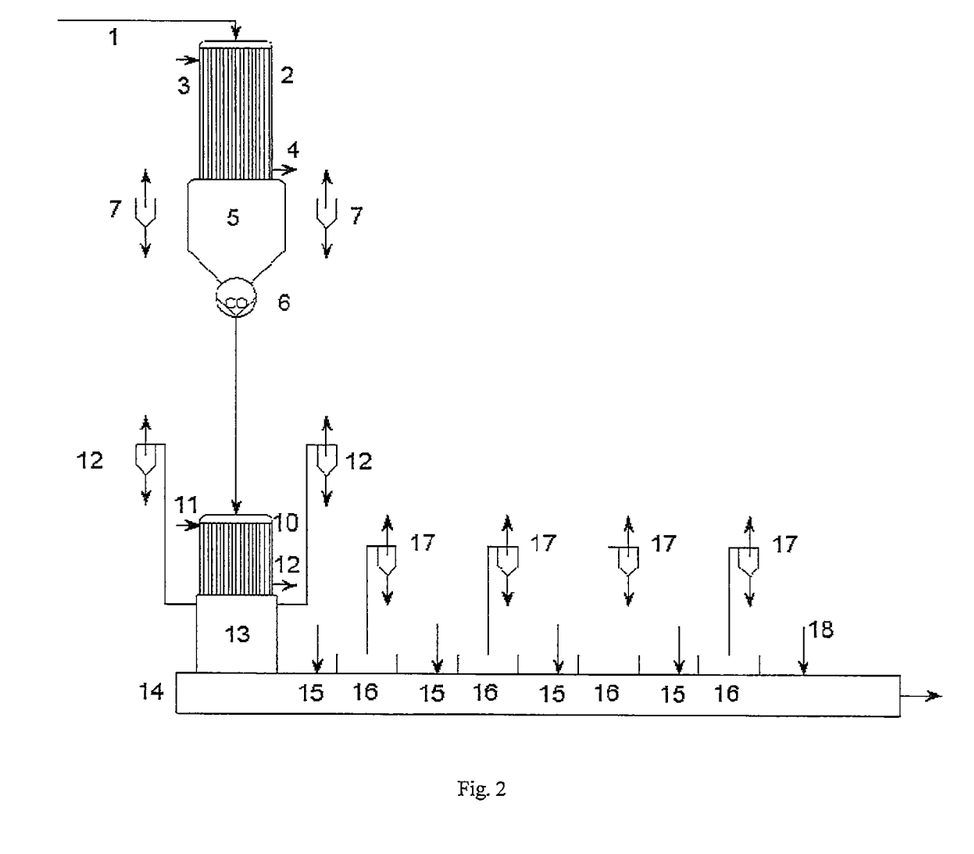
FIG. 2 illustrates an apparatus configuration as shown in Example 2.

The apparatus configuration of example 2 is shown in FIG. 2. 7500 kg/h of polycarbonate with a relative viscosity of 1.295 were supplied to the downpipe devolatilizer 2 in a solution containing 65% by weight of polycarbonate, 33.5% by weight of chlorobenzene and 1.5% by weight of dichloromethane, in a pipeline 1 with a temperature of 230° C. The downpipe devolatilizer was heated with vaporous heat carder oil via the addition 3. The condensate was discharged via the outlet 4. The length of the pipes of the downpipe devolatilizer 2 was 2.5 m, the internal diameter was 10 mm and the number of pipes was 1150. The heating temperature was 330° C., the exit temperature of the polymer on exit into the separation vessel 5 was 295° C. The pressure in the separation vessel 5 was 2 bar, the residual content of chlorobenzene was 5% by weight and the residual content of dichloromethane was 500 ppm. The vapors which formed were removed from the separation vessel via two lines. Any entrained polymer was retained in the separators 7. The vapors were then condensed in a condenser.

The concentrated polymer solution was collected in the gear pump 6 and supplied to the downpipe devolatilizer 10. The foam devolatilizer consisted of 1500 pipes with a length of 1.15 m, which were heated at 310° C. The pressure in the separation vessel 13 of the foam devolatilizer was 6 mbar. The pipes of the foam devolatilizer were heated with vaporous heat carrier oil via the addition 11. The condensed heat carrier oil was removed again via the outlet 12. The vapors which formed were removed from the separation vessel via two lines. Any entrained polymer was retained in the separators 12. The residual chlorobenzene content downstream of the foam devolatilizer was 90 ppm. The separation vessel 13 of the foam devolatilizer was arranged directly above the devolatilizing extruder 14.

The devolatilizing extruder 14 was designed as a two-flight, closely intermeshing twin-screw extruder with a nominal diameter of 180 mm and a ratio of length to diameter of 48. It was equipped with four zones 15 for introducing entraining agent into dispersion, in each case followed by devolatilizing zones 16 for removal of the entraining agent and of the volatile constituents. Any entrained polymer was retained in the separators 17. At 18 additives which were present in a mixture with polycarbonate by means of a side extruder were added. This was followed by the pressure buildup for pelletization.

The speed of the extruder was 180/min. The temperature at the end of the extruder was 345° C.; the residual chlorobenzene content was 4 ppm. Dichloromethane was no longer detectable (<0.1 ppm). The yellowness index was 1.6.

Example 3

Figure 3:
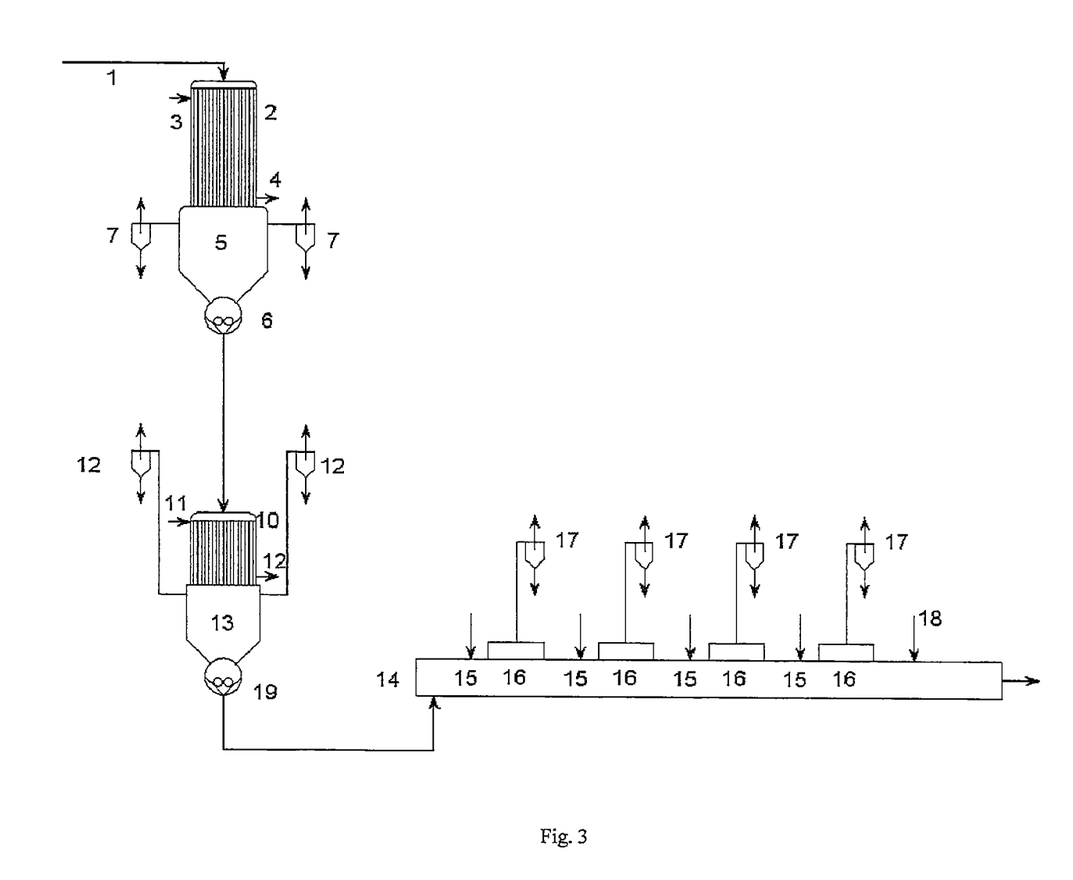
FIG. 3 illustrates an apparatus configuration as shown in Example 3.

The apparatus configuration of example 3 is shown in FIG. 3. 7500 kg/h of branched polycarbonate with a relative viscosity of 1.325 were supplied to the downpipe devolatilizer 2 in a solution containing 65% by weight of polycarbonate, 33.5% by weight of chlorobenzene and 1.5% by weight of dichloromethane, in a pipeline 1 with a temperature of 230° C. The downpipe devolatilizer was heated with vaporous heat carrier oil via the addition 3. The condensate was discharged via the outlet 4. The length of the pipes of the downpipe devolatilizer 2 was 2.5 m, the internal diameter was 10 mm and the number of pipes was 1150. The heating temperature was 330° C., the exit temperature of the polymer on exit into the separation vessel 5 was 295° C. The pressure in the separation vessel 5 was 2.5 bar, the residual content of chlorobenzene was 7% by weight and the residual content of dichloromethane was 700 ppm. The vapors which formed were removed from the separation vessel via two lines. Any entrained polymer was retained in the separators 7. The vapors were then condensed in a condenser.

The concentrated polymer solution was collected in the gear pump 6 and supplied to the downpipe devolatilizer 10. The foam devolatilizer consisted of 1500 pipes with a length of 1.15 m, which were heated at 320° C. The pressure in the separation vessel 13 of the foam devolatilizer was 4.5 mbar. The pipes of the foam devolatilizer were heated with vaporous heat carrier oil via the addition 11. The condensed heat carrier oil was removed again via the outlet 12. The vapors which formed were removed from the separation vessel via two lines. Any entrained polymer was retained in the separators 12. The residual chlorobenzene content downstream of the foam devolatilizer was 60 ppm. At the base of the foam devolatilizer, the polymer melt was collected from the gear pump 19 and supplied to the devolatilizing extruder.

The devolatilizing extruder 14 was designed as a two-flight, closely intermeshing twin-screw extruder with a nominal diameter of 180 mm and a ratio of length to diameter of 48. It was equipped with four zones 15 for introducing entraining agent into dispersion, in each case followed by devolatilizing zones 16 for removal of the entraining agent and of the volatile constituents. Any entrained polymer was retained in the separators 17. At 18 additives which were present in a mixture with polycarbonate by means of a side extruder were added. This was followed by the pressure buildup for pelletization.

The speed of the extruder was 200/min. The temperature at the end of the extruder was 380° C.; the residual chlorobenzene content was 4.5 ppm. Dichloromethane was no longer detectable (<0.1 ppm). The transmission was 88.0%.

Example 4

Figure 4:
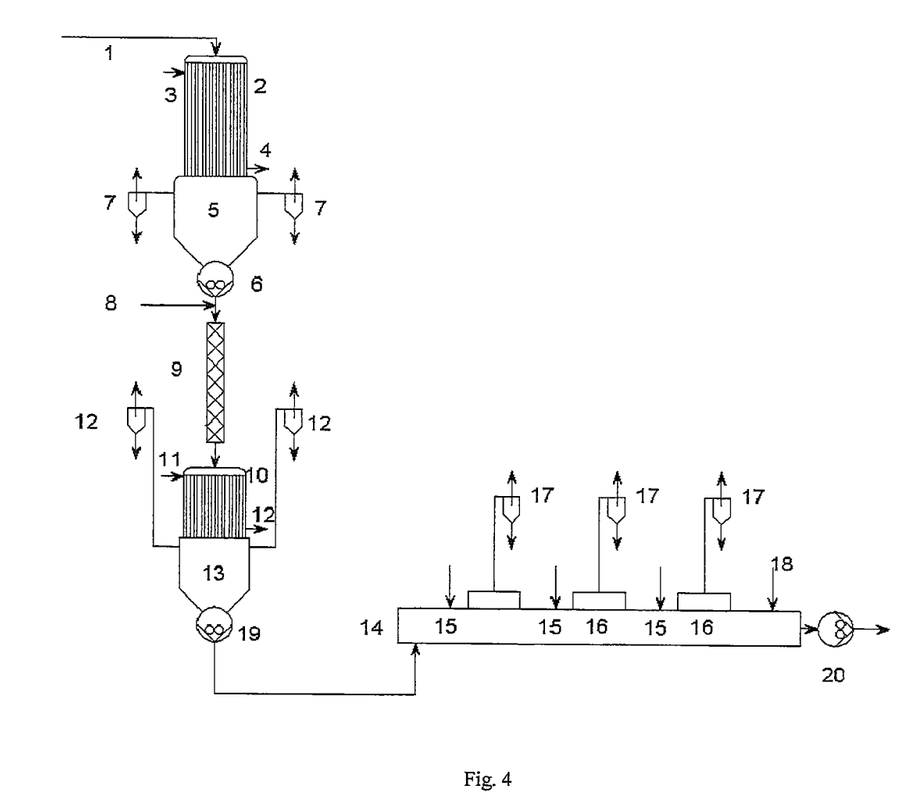
FIG. 4 illustrates an apparatus configuration as shown in Example 4.

The apparatus configuration of example 4 is shown in FIG. 4. 7500 kg/h of branched polycarbonate with a relative viscosity of 1.325 were supplied to the downpipe devolatilizer 2 in a solution containing 65% by weight of polycarbonate, 33.5% by weight of chlorobenzene and 1.5% by weight of dichloromethane, in a pipeline 1 with a temperature of 230° C. The downpipe devolatilizer was heated with vaporous heat carrier oil via the addition 3. The condensate was discharged via the outlet 4. The length of the pipes of the downpipe devolatilizer 2 was 2.5 m, the internal diameter was 10 mm and the number of pipes was 1150. The heating temperature is 300° C., the exit temperature of the polymer on exit into the separation vessel 5 was 270° C. The pressure in the separation vessel 5 was 50 mbar, the residual content of chlorobenzene is 1000 ppm and the residual content of dichloromethane is 10 ppm. The vapors which formed were removed from the separation vessel via two lines. Any entrained polymer was retained in the separators 7. The vapors were then condensed in a condenser. The pressure was adjusted with a vacuum pump.

The concentrated polymer solution was collected in the gear pump 6 and supplied to the static mixer 9. Via the addition 8, 0.1% by weight of nitrogen was added to the static mixer. The nitrogen is brought completely into solution in the static mixer 9.

The polymer melt containing the nitrogen was devolatilized further in a foam devolatilizer 11. The foam devolatilizer consisted of 1500 pipes with a length of 1.15 m, which were heated at 320° C. The pressure in the separation vessel 13 of the foam devolatilizer was 1 mbar. The pipes of the foam devolatilizer were heated with vaporous heat carrier oil via the addition 11. The condensed heat carrier oil was removed again via the outlet 12. The vapors which formed were removed from the separation vessel via two lines. Any entrained polymer was retained in the separators 12. The residual chlorobenzene content downstream of the foam devolatilizer was 15 ppm. At the base of the separation vessel 13 of the foam devolatilizer, the polymer melt was collected with the gear pump 19 and pumped to the devolatilizing extruder 15.

The devolatilizing extruder 14 was designed as a two-flight, closely intermeshing twin-screw extruder with a nominal diameter of 180 mm and a ratio of length to diameter of 40. It was equipped with three zones 15 for introducing entraining agent into dispersion, in each case followed by devolatilizing zones 16 for removal of the entraining agent and of the volatile constituents. Any entrained polymer was retained in the separators 17. At 18 additives which were present in a mixture with polycarbonate by means of a side extruder were added. The pressure for pelletization was built up with a gear pump 20.

The speed of the extruder was 160/min. The temperature at the end of the extruder was 360° C.; the residual chlorobenzene content was 1.2 ppm. Dichloromethane was no longer detectable (<0.1 ppm). The transmission was 88%.

Comparative Example 5

6500 kg/h of polycarbonate were isolated in an extruder with backward devolatilization from a solution of 65% polycarbonate, 33.5% chlorobenzene and 1.5% dichloromethane. Just as in example 1, the devolatilizing extruder used was configured as a closely intermeshing, corotating twin-screw extruder and had a nominal diameter of 180 mm, a ratio of length to diameter of 48, and was of two-flight design in the intake zone and the devolatilizing zones. In the entraining agent zone, just as in example 1, 1.3 kg/h of nitrogen were supplied. The temperature of the polymer solution before the backward devolatilization was 185° C.

The residual chlorobenzene content was 410 ppm and the temperature at the die of the extruder was 409° C. The yellowness index was 2.3. The dichloromethane content was 0.5 ppm.

Example 6

67 kg/h of branched polycarbonate with a relative viscosity of 1.316 were supplied to a downpipe devolatilizer with 19 pipes in a solution containing 65% by weight of polycarbonate, 33.5% by weight of chlorobenzene and 1.5% by weight of dichloromethane in a pipeline 1 with a temperature of 230° C. The pipes had an internal diameter of 10.3 mm and a length of 2.5 m. The heating temperature was 300° C., the pressure in the separator 1.1 bar. The solution thus concentrated by evaporation was mixed with 100 g/h of nitrogen in a static mixer and to a foam devolatilizer with 22 pipes with an internal diameter of 10 mm and a length of 1.5 m conducted into a twin-shaft extruder with four devolatilizing zones. The pressures in the devolatilizing zones were between 3.5 and 5 mbar. Upstream of the second, third and fourth devolatilizing zones, in each case 100 grams per hour of nitrogen were dispersed. The residual chlorobenzene contents were 1.3 ppm. Dichloromethane was undetectable (<0.5 ppm). The residual contents of cresols were less than 1 ppm. The residual contents of free BPA were 2 ppm. The residual contents of free phenol were 11 ppm. The residual contents of free diphenyl carbonate were 2 ppm. The contents of phenolic OH end groups were 170 ppm. The residual contents of alkali metals and alkaline earth metals together were less than 0.05 ppm (detection limit). The residual contents of carbon tetrachloride were less than the detection limit of 0.01 ppm. The residual contents of nonhalogenated aromatic compounds were less than 5 ppm (detection limit). The residual content of pyridine was less than 0.01 ppm (detection limit).

The invention claimed is:

1. An aromatic polycarbonate comprising less than 10 ppm of aromatic chlorine compounds, less than 1 ppm of dichloromethane, less than 15 ppm of monohydric phenols, and less than 10 ppm of aromatic compounds containing no chlorine.

2. The aromatic polycarbonate as claimed in claim 1, comprising less than 5 ppm of aromatic compounds containing no chlorine.

3. The aromatic polycarbonate as claimed in claim 1, comprising less than 0.01 ppm of carbon tetrachloride, less than or equal to 2 ppm of diaryl carbonates, less than or equal to 2 ppm of bisphenols, less than 0.05 ppm of alkali metals, less than 1 ppm of cresols, and less than 300 ppm of phenolic OH groups.

4. The aromatic polycarbonate as claimed in claim 2, comprising less than 0.01 ppm of carbon tetrachloride, less than or equal to 2 ppm of diaryl carbonates, less than or equal to 2 ppm of bisphenols, less than 0.05 ppm of alkali metals, less than 1 ppm of cresols, and less than 300 ppm of phenolic OH groups.

5. The aromatic polycarbonate as claimed in claim 1, comprising less than 1 ppm of pyridine.

6. The aromatic polycarbonate as claimed in claim 1, comprising less than 0.1 ppm of pyridine.

7. The aromatic polycarbonate as claimed in claim 2, comprising less than 1 ppm of pyridine.

8. The aromatic polycarbonate as claimed in claim 2, comprising less than 0.1 ppm of pyridine.

* * * * *